United States Patent Office 3,328,723
Patented June 27, 1967

3,328,723
OPTICAL FREQUENCY PARAMETRIC OSCILLA-
TORS AND MODULATORS WITH TEMPERA-
TURE AND ELECTRICAL CONTROL
Joseph A. Giordmaine and Robert C. Miller, Summit,
N.J., assignors to Bell Telephone Laboratories, Incor-
porated, New York, N.Y., a corporation of New York
Filed Dec. 23, 1965, Ser. No. 515,926
3 Claims. (Cl. 331—107)

This is a continuation-in-part of our copending application, Ser. No. 459,173, filed May 27, 1965, now abandoned, and relates to optical nonlinear devices, and, more particularly, to such devices exhibiting birefringence which are useful as oscillators and modulators over a range of optical frequencies.

In a copending United States patent application Ser. No. 414,366, now Patent No. 3,262,058, of A. A. Ballman, G. D. Boyd and R. C. Miller, there is disclosed a number of parametric devices for producing oscillations at optical frequencies and which make use of lithium metaniobate ($LiNbO_3$), a nonlinear, birefringent crystalline material. The characteristic of birefringence makes possible the achievement of parametric interactions within the crystal through the phase matching of the various waves involved in the parametric process. As disclosed in that application, phase matching is achieved by adjusting the birefringence, which is defined as the difference between the indices of refraction for the ordinary and extraordinary rays. This difference, and hence the birefringence, is a maximum when the beam or rays are normal to the optic axis and a minimum, i.e., zero, when the rays are parallel to the optic axis. Since the velocity of a wave through the crystal, which is dispersive, decreases with increasing frequency, and also is inversely proportional to the index of refraction, it follows that phase matching can be achieved by varying the birefringence provided there is adequate birefringence for the frequencies involved. The birefringence can be varied by rotating the crystal so that the angular relationship of the beam to the optic axis is varied. Another arrangement for varying the birefringence which is of importance to the present invention is one in which the temperature of the crystal is varied.

Phase matching of the waves or rays within the crystal has the effect of increasing the coherence length, or the length over which interaction occurs. However, since materials of the type here considered exhibit double refraction whenever the ray or wave is at an angle other than 90 degrees or zero degree to the optic axis, which occurs when crystal rotation is utilized, the coherence length is not as great as it theoretically can be, and hence the efficiency of the parametric process is reduced. This limitation on the efficiency can effectively be removed by making use of the temperature dependence of the birefringence. The beam incident upon the crystal can be directed at 90 degrees to the optic axis, the condition for maximum efficiency, and the temperature of the crystal varied to achieve the desired phase matching for the particular frequencies of interest. In a parametric oscillator, the output frequencies of the crystal can be varied by varying the temperature, while the angular relationship between wave and optic axis remains 90 degrees, thereby insuring a high interaction efficiency.

It can be appreciated that the temperature dependence of birefringence in such materials as $LiNbO_3$ or KDP makes possible a high efficiency oscillator. However, this very use of temperature as a controlling parameter introduces certain problems or drawbacks that generally typify temperature controlled arrangements. Frequency variation through temperature control is a slow process, relatively speaking, and hence such arrangements are virtually useless as modulators. In addition, for a fixed frequency output, such an arrangement is not completely stable, again because of the slowness or time lag inherent in thermostat systems for maintaining a constant temperature and hence a constant frequency output.

It is one object of the present invention to insure a stable oscillatory output from a temperature controlled oscillator of the type discussed in the foregoing and in the aforementioned Ballman et al. application, despite slight variations in temperature and the time lag inherent in thermal control arrangement.

The invention has as another object the production of precisely controlled variations in the frequency or amplitude of the oscillatory output, thereby giving rise to frequency or amplitude modulation.

In one illustrative embodiment of the invention, a coherent light beam, preferably plane polarized from a laser source, such as, for example, a calcium tungstate-neodymium ($CaWO_4:Nd^{+3}$) laser is directed into a nonlinear birefringent crystal of material such as $LiNbO_3$ or KDP in a direction normal to the optic axis thereof, to produce a second harmonic output from the crystal. The second harmonic beam is directed into a second crystal of, for example, $LiNbO_3$, at right angles to the optic axis thereof. This second crystal, which has dielectric coatings on its ends to produce a cavity resonator, is maintained at a "constant" temperature by suitable techniques known in the art, so that a parametric oscillation process occurs in the crystal and an oscillatory output is obtained, the frequency of which is determined by the temperature of the crystal. To insure a constant frequency output, a portion of the output beam is monitored by means to be discussed more fully hereinafter, and a voltage is produced, the magnitude of which is a measure of the deviation from the desired frequency. This voltage is applied across the crystal in a manner such that the indices of refraction, and hence the frequencies, within the crystal are changed through the linear electro-optic effect to correct the frequency deviation. As a consequence, a very rapid automatic frequency control is assured, and the crystal output frequency is stabilized.

In another embodiment of the invention, an accurate variable frequency arrangement results from the application of a voltage from an independent source to the crystal. As a consequence, coarse or large frequency changes can be achieved by means of controlled temperature changes, and fine adjustments made with variations in the applied voltage. This arrangement can be incorporated into the first embodiment, or it can be used to produce a modulation of the output signal where the voltage source is a source of signals.

In another embodiment of the invention, pump and signal waves are introduced into the crystal and their phases matched for optimum parametric amplification of the signal. An electric field applied across the crystal varies the phase match and hence the degree of amplification of the signal. The output of the crystal is, therefore, an amplitude modulated signal.

In still another embodiment of the invention, a pair of electric fields are applied along two axes of the crystal in a specific ratio, or a single field applied at an angle to the crystal defined by that ratio, to overcome the frequency pulling effects of cavity modes and give precise electric tuning of the crystal output.

In all of the embodiments of the invention, a voltage is applied across the crystal to produce a control over the output frequency through the linear electro-optic effect. This voltage control is, in all cases, in addition to a primary frequency control of some sort, preferably temperature, but also others, such as, for example, angular control through crystal rotation.

The principles and features of the invention will be more readily understood from the following detailed description, taken in conjunction with the accompanying drawings, in which.

Figure 1:
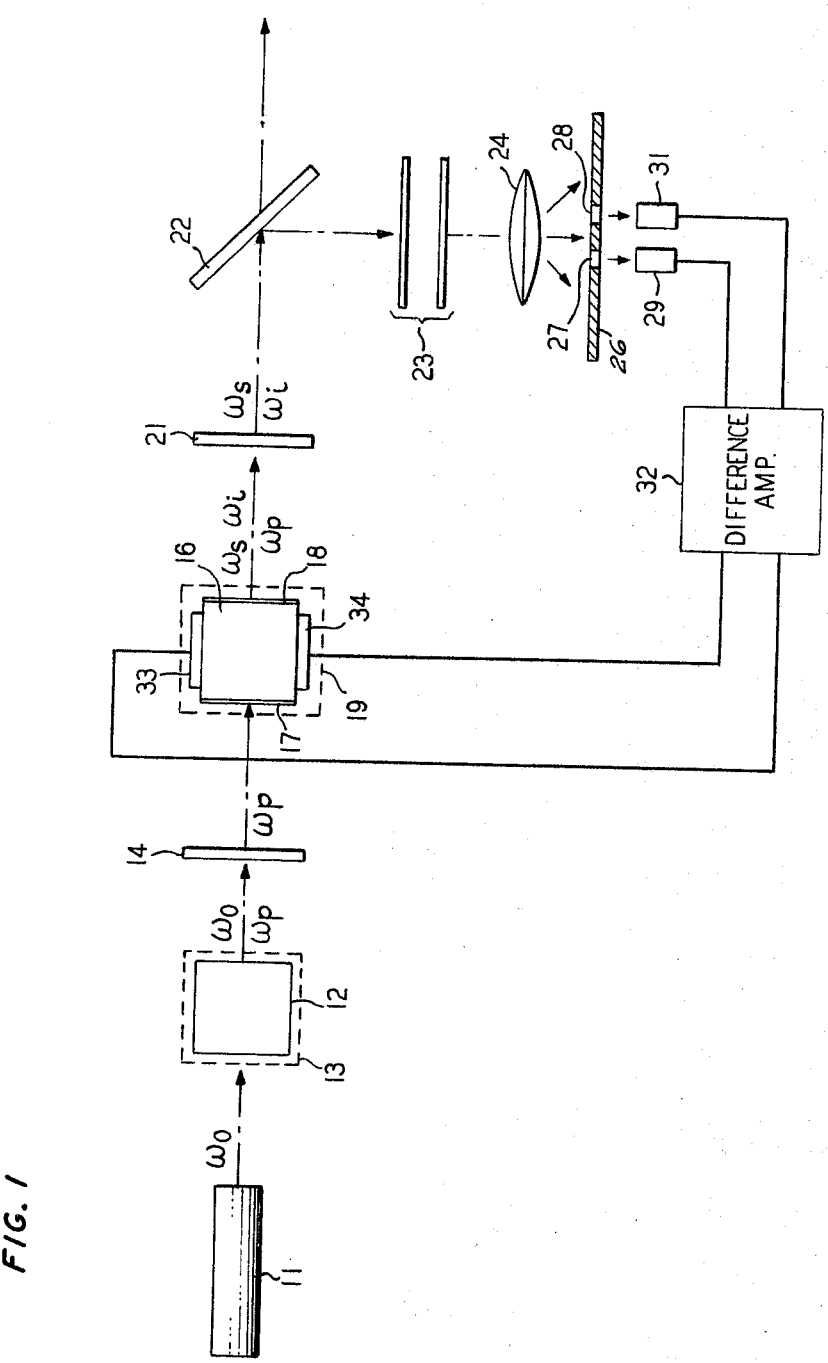
FIG. 1 is a schematic diagram of an illustrative embodiment of the invention.

In the arrangement of FIG. 1, a coherent radiation source 11, which may be, for example, an optical maser of calcium tungstate-neodymium, produces an output beam which is directed into a crystal 12 of suitable material such as lithium metaniobate, in a direction normal to the optic axis of crystal 12, which in FIG. 1 is normal to the plane of the drawing. Preferably, although not absolutely necessarily, the beam of light is plane polarized. Under such conditions, crystal 12 produces an output beam that contains not only the fundamental frequency $\omega_o$ from laser 11, but also second harmonic components at the frequency $\omega_p$ where $\omega_p$ is twice $\omega_o$. For optimum harmonic generation, crystal 12 is maintained at a fixed temperature which affords optimum phase matching for second harmonic generation by any suitable means 13. Various and numerous fixed temperature arrangements are known in the art, any number of which is adequate to maintain crystal 12 at a fixed temperature, hence means 13 is simply depicted in dotted outline.

The output of crystal 12 is passed through a filter 14 which filters out frequency $\omega_o$ and passes frequency $\omega_p$ and the beam at $\omega_p$ is directed into a nonlinear birefringent crystal 16 of suitable material, such as lithium metaniobate, in a direction normal to the optic axis. Crystal 16 is coated on its ends by suitable dietlectric coatings 17 and 18 to form an optical cavity resonator resonant at the desired oscillation frequency. Alternatively, of course, the resonator may be formed by mirrors spaced from the crystal, which gives a measure of adjustment of the resonant frequency of the resonator. Coatings 17 and 18, in accordance with conventional laser practice, are partially transmissive and partially reflective.

As is the case with crystal 12, crystal 16 is maintained at a fixed temperature by suitable means 19. As discussed heretofore, the non-linearity and birefringence of crystals of the present type permit parametric interaction over a wide range of frequencies. Thus an extraordinary ray pump wave can be phase-matched to ordinary ray signal and idler waves within the crystal. The phase-matching condition determines the frequency of the signal and idler waves, and these frequencies can be varied over a wide range by means of variations in the crystal temperature. Consequently, temperature control means 19 is adjustable so that crystal 16 is maintained at a fixed temperature within a wide range, the fixed temperature producing the desired signal and idler output frequencies.

The beam emerging from crystal 16 contains frequencies $\omega_p$, $\omega_s$, and $\omega_i$, where $\omega_s$ is the signal frequency and $\omega_i$ is the idler frequency, which were generated in crystal 16. To eliminate the pump frequency $\omega_p$, and, where desired, the idler frequency $\omega_i$, the beam is passed through one or more filters 21, where the undesired frequency is eliminated.

As was pointed out earlier, a constant temperature arrangement is generally slow in responding to a slight change in temperature and applying the necessary connection. In addition, it is sometimes difficult to achieve the exact temperature desired, in the absence of expensive and complex apparatus. Since any temperature variations in crystal 16 affect the output frequencies, it is desirable to counteract in some way these changes so that the output frequencies remain at the desired value. To this end, in the arrangement of FIG. 1, a partially reflecting mirror or prism 22 is placed in the path of the beam to divert a portion thereof along a new path while the remainder of the beam continues along the same path. The diverted portion of the beam is passed into a Fabry-Perot interferometer 23, the output of which is focused by a lens 24 onto a plate 26. As is well known, the output of such a device 23 and hence the image on plate 26 is a series of concentric light rings whose radii remain constant as long as the frequency of the input to the interferometer remains constant. Any slight frequency change causes a change in diameter of the rings. To detect this change in the rings, plate 26 has a pair of apertures 27 and 28 which pass light from the interferometer 23 to a pair of photomultipliers 29 and 31. Apertures 27 and 28 may, for example, be asymmetrically placed the width of a fringe or ring apart. As long as there is no change in the intensity of the light reaching the photomultipliers, that is, constant frequency, their outputs are equal, the photomultipliers and aperture positions having been so adjusted for this condition. When a change in frequency produces a shift or change in the interferometer rings, the fringe or ring shifts and one photomultiplier receives more light than the other so that there is a difference in the outputs of the photomultipliers 29 and 31 which is fed to a difference amplifier 32. The difference amplifier compares the outputs of the photomultipliers and produces a voltage output proportional to the difference in outputs of the photomultipliers. The output voltage of the amplifier 32 is applied across crystal 16 by means of contacts or plates 33 and 34 on the sides of the crystal. This voltage causes a change in the phase matching condition, as discussed heretofore, and hence a shift in the output frequencies in a direction to correct the original frequency drift until the net output of the devices 29 and 31 is again zero.

From the foregoing discussion of FIG. 1, it can be appreciated that a fast, accurate, automatic frequency stabilization of the output of crystal 16 is achieved. It is, of course, perfectly feasible to utilize other monitoring arrangements, such as extremely narrow passband Lyot filters, to detect a frequency change in the crystal output, so long as such an arrangement produces a voltage for application to the crystal to correct the frequency drift.

Figure 2:
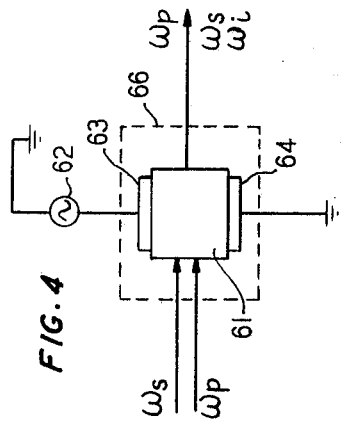
FIG. 2 is a schematic diagram of a modulation arrangement utilizing the principles of the present invention.

In the foregoing, it was shown how an electric field applied to a nonlinear birefringent crystal can be used to stabilize the crystal output frequency. The same principles can be utilized to produce a frequency modulation of the oscillatory output of the crystal. In FIG. 2, there is shown schematically such a frequency modulation arrangement. For simplicity, only the nonlinear birefringent crystal in which the parametric process takes place is shown.

The arrangement of FIG. 2 comprises a crystal 41 of suitable material, as discussed in the foregoing, having dielectric coatings 42 and 43 on its ends to produce a resonant cavity, resonant at the desired oscillatory frequency. As was the case in FIG. 1, mirrors 42 and 43 may be spaced from crystal 41 if desired. Crystal 41 is maintained at a constant temperature for optimum phase matching of the desired oscillatory output frequency $\omega_s$ to the pump $\omega_p$ by means 44.

A beam of pump energy at frequency $\omega_p$ is directed into crystal 41, where parametric generation of frequencies $\omega_s$ and $\omega_i$ occurs. A modulating signal from a source 46 is applied across the crystal 41 by plates or contacts 47 and 48 to produce a change $\Delta\omega$ in both the signal and idler frequencies, so that the ouput of crystal 41 includes the frequency modulated components $\omega_s \pm \Delta\omega$ and $\omega_i \pm \Delta\omega$.

Figure 3:
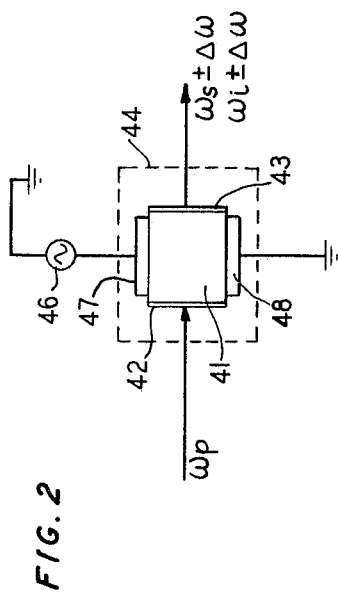
FIG. 3 is a graph depicting the modulation characteristics of the arrangement of FIG. 2.

In FIG. 3 there is shown a schematic diagram illustrating the frequency modulation process. FIG. 3 is a diagram of gain versus frequency for the arrangement of FIG. 2. Each of the curves 51 through 55 represents an oscillatory mode of the resonator cavity formed by mirrors 42 and 43. In addition, the dashed curve 56 represents the gain profile of the resonator when operation is primarily in the mode designated 53. In the operation of the arrangement of FIG. 2, the modulating signal produces a change $\Delta\omega$ in the frequency of mode 53, as indicated. For this application, the mode 53 remains the principal mode of oscillation, and the frequencies swing $\pm\Delta\omega$ having little effect on the gain in the principal mode. On the other hand, a form of pulse modulation can be achieved where the modulating signal causes sufficient mismatch to make mode 52 or 54 the principal mode of oscillation. In this form of modulation, the oscillation jumps or is pulsed from one mode of oscillation to another, producing a frequency pulsed output. The abruptness or smoothness of the mode transitions can be altered by varying the length of the resonator. An increase in length produces more modes closely spaced in frequency, while a short resonator has fewer modes of widely spaced frequencies.

Figure 4:
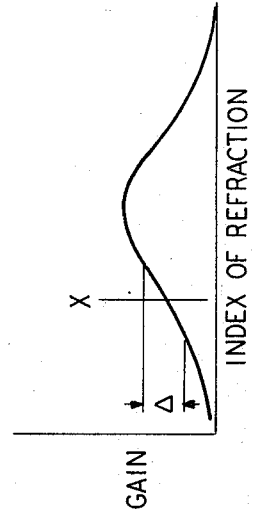
FIG. 4 is a schematic diagram of another modulation arrangement utilizing the principles of the present invention.

Utilizing the principles of the present invention, amplitude modulation of a light beam can be had. In FIG. 4, there is shown such an arrangement, with only the crystal, wherein the parametric process occurs, being shown. The arrangement of FIG. 4 comprises a crystal 61 of suitable material, as discussed heretofore, into which are directed a beam of pump energy $\omega_p$ and a beam of signal energy $\omega_s$ from suitable sources, not shown, in a direction normal to the optic axis of said crystal. A modulating signal from a source 62 is applied across the crystal 61 through plates or contacts 63 and 64. Crystal 61 is maintained at a fixed temperature, as discussed heretofore, by suitable means 66. Through the medium of the linear electro-optic effect, the modulating voltage changes the index of refraction of the crystal 61. For optimum amplification, the velocities of the signal and pump waves in the crystal are matched so that a form of traveling wave interaction takes place. This matched condition is readily achieved, as discussed heretofore, by controlling the temperature of the crystal.

Figure 5:
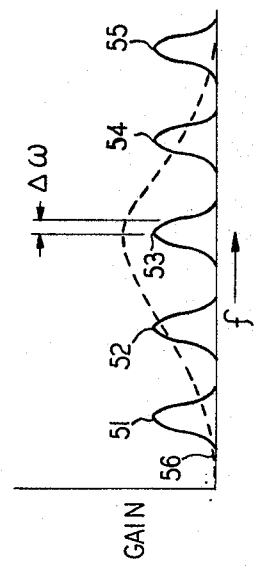
FIG. 5 is a graph depicting the modulation characteristics of the arrangement of FIG. 4.

Any changes in the index of refraction in the crystal change the coupling of the signal and the pump wave, and hence the degree of amplification of the signal. In FIG. 5 this situation is graphically depicted in a gain versus index of refraction graph. For modulation, the temperature of the crystal is set and maintained to produce operation at point X in FIG. 5. The changes in index due to the modulating signal then produce a gain swing of $\Delta$ in the signal wave, as shown, with the net result that the output of the crystal includes an amplitude modulated signal wave.

Figure 6:
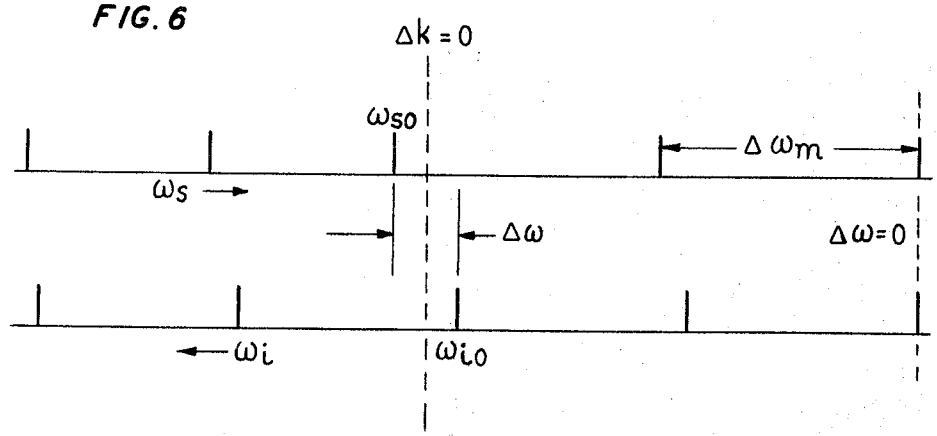
FIG. 6 is a chart of the mode spacings in an optical cavity resonator.

In the foregoing embodiments, the types of resonators disclosed, generally known as Fabry-Perot resonators, are characterized by discrete modes of oscillation. This is illustrated in FIG. 6, in which any vertical line intersecting the $\omega_s$ line and the $\omega_i$ line satisfies the condition $\omega_p = \omega_s + \omega_i$. The vertical spikes on the $\omega_s$ and $\omega_i$ lines represent the modes of the cavity.

Temperature tuning leads to perfect phase-matching between pump, signal, and idler waves for the frequency combination shown by the line $\Delta k = 0$. $k$ is a parameter which is equal to $2\pi/\lambda_c$ where $\lambda_c$ is wavelength in the crystal, and $\Delta k$ is equal to the $k$ of the pump minus the sum of $k$ (signal) and $k$ (idler). In general, this vertical line does not coincide with signal and idler modes, falling between the closest signal and idler modes $\omega_{s0}$ and $\omega_{i0}$, whose sum differs from the pump frequency by $\Delta\omega$. Obviously, where the signal and idler modes coincide with the dashed line $\Delta k = 0$, $\Delta\omega = 0$. It can readily be shown that only a very small increase in pump power will cause the system to operate at a $\Delta\omega \cong 0$ point that may be tens of wave numbers away from the $\Delta k = 0$ point determined by the temperature. As a consequence, with Fabry-Perot resonators, it is often quite difficult to achieve oscillation at or very close to the desired operating frequency.

Figure 7:
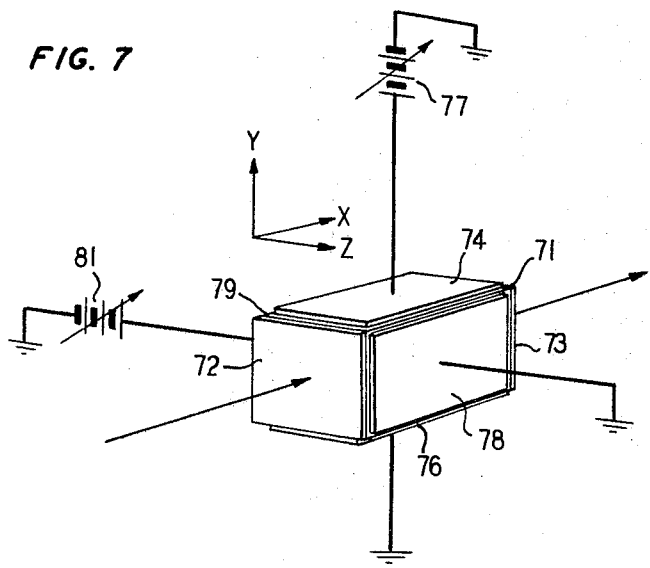
FIG. 7 is a perspective diagram of another frequency timing arrangement utilizing the principles of the invention.

In FIG. 7 there is shown an arrangement whereby operation may be achieved within one-quarter of the cavity mode spacing $\Delta\omega_m$ of the desired frequency. The arrangement of FIG. 7 comprises a crystal 71 of suitable material, such as lithium metaniobate into which is directed a light beam from a suitable source, not shown, in the manner of FIG. 1, for example. Crystal 71 is coated on its ends by suitable dielectric coatings 72, 73 to form an optical cavity resonator. Coatings 72, 73 are, as before, partially transmissive and partially reflecting. As in the arrangement of FIGS. 1 or 2, for example, crystal 71 is maintained at a temperature by suitable means, not shown, which produces phase matching and, hence, parametric operation within the crystal.

A pair of contacts or plates 74, 76 are mounted on crystal 71 in such a manner that a voltage from a variable voltage source 77 is applied across crystal 71 parallel to the Y-axis thereof. In like manner a second pair of plates 78, 79 connected to a variable voltage source 81 apply a voltage across crystal 71 parallel to the Z-axis thereof. As was discussed previously, an electric field applied to the crystal changes the phase matching at the frequencies for which $\Delta k = 0$. In addition, however, an applied field also changes the frequencies of the signal and idler modes. Both of these changes occur as a consequence of the electro-optic effect. If electric fields are applied along the Y and Z axes at random, both the $\Delta k = 0$ frequencies and the mode frequencies are changed. The changes in the indices of refraction through the electro-optic effect produced by these fields are given by $$\Delta n^o = -\frac{(n^o)^3}{2}(r_{22}E_y + r_{13}E_z) \qquad (1)$$

and $$\Delta n^e = -\frac{(n^e)^3}{2}(r_{33}E_z) \qquad (2)$$

where $n^o$ and $n^e$ are the ordinary and extraordinary indices of refraction respectively, $r_{ij}$ are the linear electro-optic coefficients, and $E_y$ and $E_z$ are the applied fields. The linear electro-optic coefficients are readily determined for a particular crystal by means of Equations 1 and 2 when $\Delta n$, a measureable quantity, is known.

It can also be shown that if the fields are applied in the ratio $$\frac{E_y}{E_z} = \frac{(r_{33} - r_{13})}{r_{22}} \qquad (3)$$

the frequencies determined by $\Delta k = 0$ remain unchanged, but the cavity mode frequencies are shifted to within one-quarter of the mode spacing of the $\Delta k = 0$ frequencies. Since this spacing represents only a very small change in frequency, very accurate tuning is possible. In operation, the crystal 71 of FIG. 7 is temperature tuned by suitable means, not shown, to what it should be for the desired operating frequency, and then the fields are applied in the ratio, given in Equation 3 and increased until oscillation occurs within one-quarter of the cavity mode spacing of the desired frequency.

The arrangement of FIG. 7 has been shown as having two fields applied. It is, of course, possible to apply a single field at the angle defined by the ratio of Equation 3 and increase the field until the desired oscillation occurs.

What is claimed is:

1. A parametric device comprising a birefringent crystal, means for introducing a beam of coherent light at a first frequency into said crystal to produce oscillations at other frequencies in said crystal, said radiation being at an angle to the optic axis of said crystal, means for varying the frequency of the output of said crystal comprising means for varying the temperature of said crystal and further means for controlling the output frequency of said crystal to within one quarter of the cavity mode spacing of the desired frequency comprising means for applying a direct current voltage across said crystal along a first axis thereof and a second different direct current voltage along a second axis thereof.

2. A parametric device as claimed in claim 1 in which the relative magnitudes of the applied fields are given by $$\frac{E_y}{E_z} = \frac{r_{33} - r_{13}}{r_{22}}$$

where $E_y$ and $E_z$ are the voltages applied along the Y and Z axes of the crystal, respectively, and $r_{33}$, $r_{13}$, and $r_{22}$ are the linear electro-optic coefficients of the crystal.

3. A parametric device comprising a birefringent crystal, means for introducing a beam of coherent light at a first frequency into said crystal, to produce oscillations at other frequencies in said crystal, said light beam being at an angle to the optic axis of the crystal, means for varying the frequency of the output of said crystal comprising means for varying the temperature of said crystal and further means for controlling the output frequency of said crystal comprising means for applying a voltage across said crystal at an angle to the axes thereof, the angle being defined by $$\frac{E_y}{E_z} = \frac{r_{33} - r_{13}}{r_{22}}$$

where $E_y$ and $E_z$ are the components of the applied field parallel to the Y and Z axes, respectively, of the crystal, and $r_{33}$, $r_{13}$, and $r_{22}$ are the linear electro-optic coefficients of the crystal.

References Cited

UNITED STATES PATENTS 3,175,088   3/1965   Herriott _____ 250—199

ROY LAKE, *Primary Examiner.*

DARWIN R. HOSTETTER, *Examiner.*